Jan. 24, 1939.   W. HUTTON ET AL   2,144,976
CRANK BRACKET FOR CYCLES
Filed Dec. 12, 1936   2 Sheets-Sheet 1
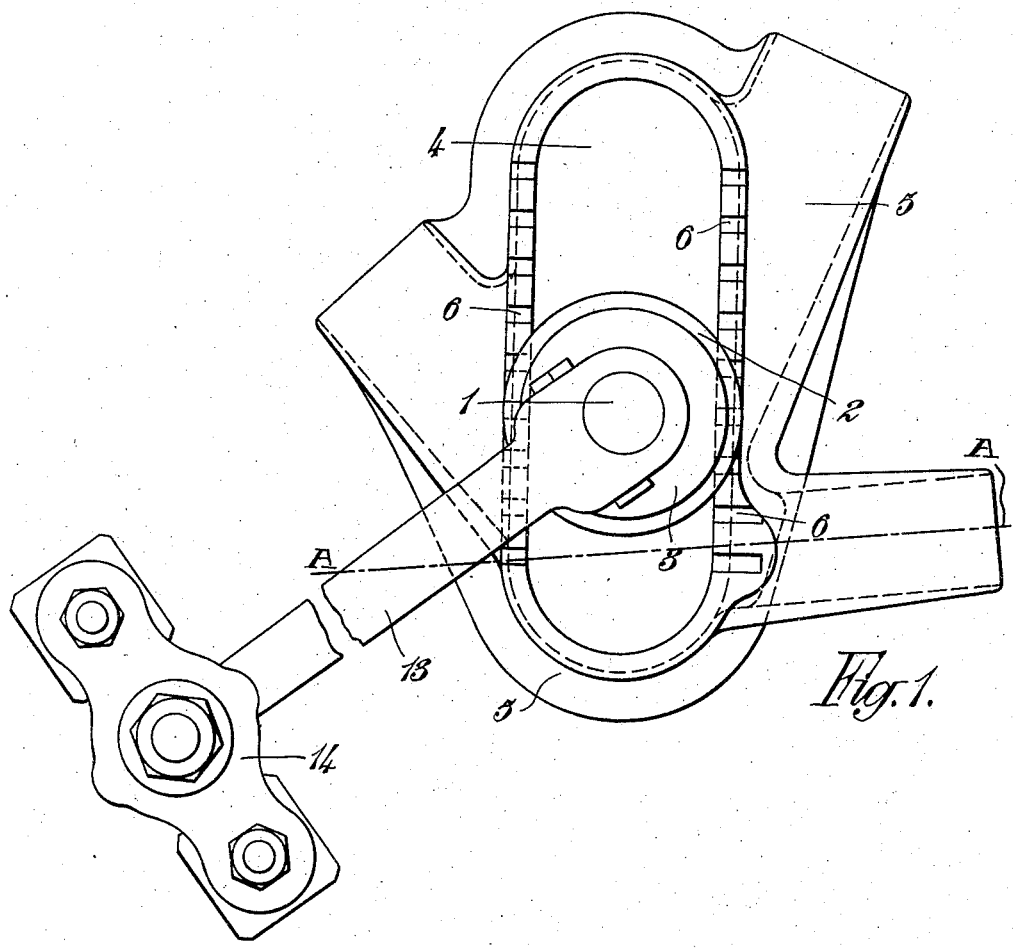
Fig. 1.
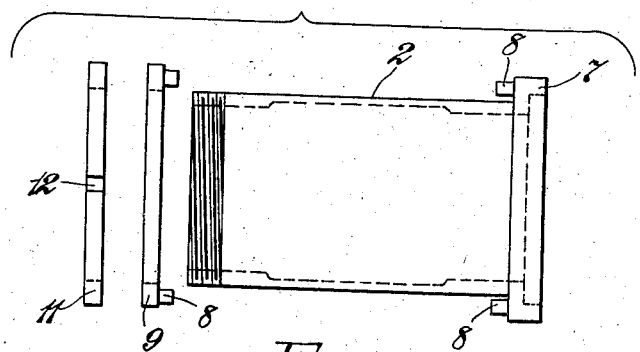
Fig. 4.   W. Hutton &
E. B. Hammond
INVENTORS
By: Glascock Downing & Seebold
Attys.

Jan. 24, 1939. W. HUTTON ET AL 2,144,976
CRANK BRACKET FOR CYCLES
Filed Dec. 12, 1936 2 Sheets-Sheet 2

W. Hutton &
E. B. Hammond
INVENTORS

By Glascock Downing & Seebold
ATTYS.

Patented Jan. 24, 1939

2,144,976

UNITED STATES PATENT OFFICE 2,144,976

CRANK BRACKET FOR CYCLES

William Hutton, Glasgow, and Edward Buchanan Hammond, Giffnock, Glasgow, Scotland Application December 12, 1936, Serial No. 115,610
In Great Britain August 11, 1936

2 Claims. (Cl. 308—59)

This invention has reference to bicycles, tricycles and the like, hereafter referred to as cycles.

It is usual to support the saddle of a cycle by means of a pillar or rod adjustably clamped in the rear supporting column of the bicycle frame. Said pillar is adjusted up and down to suit the "leg length" of the rider.

It has heretofore been proposed to provide a child's tricycle with a crank pin bearing adjustably secured in substantially vertical slots provided in a hanger carried by the frame or body part of the tricycle.

The object of the present invention is to provide improvements in cycles, tricycles and the like, whereby the length between the saddle and crank pin bearing can be easily altered without adjusting the saddle, which will enable the crank pin bearing to be quickly and securely locked in its adjusted position and which will not add materially to the weight of the cycle, tricycle or the like while ensuring that no accidental displacement of the crank pin bearing can occur.

One form of the invention will now be described by way of example with reference to the accompanying drawings, in which:—

Figure 1 is a side elevation of the crank bracket and crank.

Figure 4 is the crank bearing bush, nut and washer.

Figure 3:
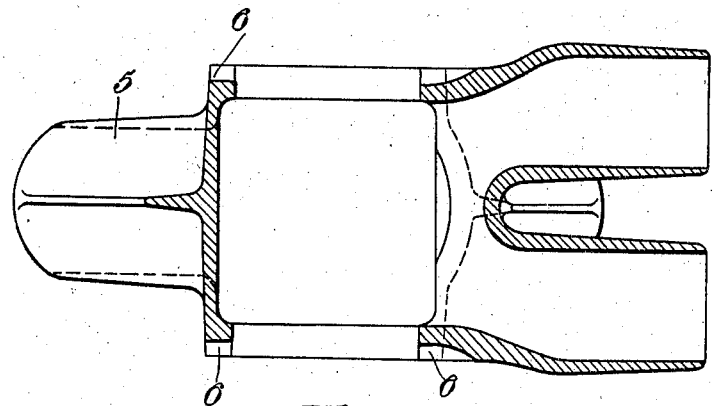
Figure 3 is a sectional plan of Figure 1 on the line AA.
Figure 2:
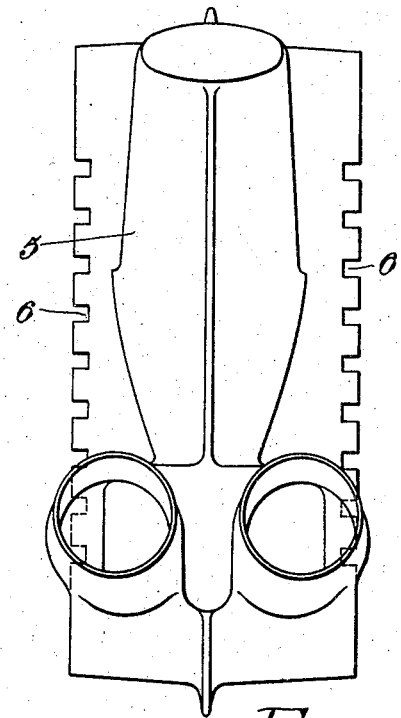
Figure 2 is an end view of Figure 1 with the crank bearing removed.

According to the preferred embodiment of the invention, as illustrated in the drawings, the crank spindle 1 of a cycle is carried by a bush 2 provided with ball bearings 3. The bush 2 or bearing is accommodated within a vertical slot 4 formed in the crank bracket 5. The bracket 5 is provided with the usual lugs having sockets for supporting the rear fork, and the rear and forwardly extending columns of the frame.

Each face of said bracket is provided with a series of horizontally extending slots 6. The bush 2 is provided with a flange 7 in which are mounted two pins 8 which are adapted to fit into the slots 6 and thus locate the bush in the desired position. The other end of the bush 2 is supported by a clamping ring 9 or washer which has pins 8 thereon which fit into the slots 6. The end of the bush is screw threaded and a threaded ring or nut 11 is screwed thereon and tightened up by means of the slots 12 provided therein for the purpose.

The cranks 13 carrying the pedals 14 are secured to the crank spindle 1 in any suitable manner.

When the cyclist desires to alter the "leg length" of the cycle he does not alter the position of the saddle, but slackens said nut 11, pulls the ring 9 and the flange 7 away from their respective faces of the bracket to remove the pins 8 from the slots 6, moves the bush up or down in the slot in the bracket, depending on whether the "leg length" has to be decreased or increased and then replaces the pins in the slots and screws the nut 11 up tightly.

Said slot 4 in the crank bracket 5 may be of such length as will permit the bearing bush 2 carrying the crank spindle being adjusted to the extent of several inches.

The bush may be provided with clamping rings or plates at each end instead of the flange thereon and screw or other means for fixing them by means of which the bush can be tightly secured after adjustment in the slotted bracket.

We claim:

1. In bicycles, tricycles and the like, a one piece crank bearing bracket having a substantially vertical slot and, at the sides of said slot, a series of horizontally disposed slots, a crank bearing adjustable in said substantially vertical slot, so that the length between the saddle and crank bearing can be altered to suit the rider without altering the position of the saddle, and means for securing said bearing in its adjusted position, said means comprising end flanges, projections carried by said flanges and adapted to engage with the horizontally extending slots and thereby lock the bearing therein, and screw means by which the flanges are prevented from endwise displacement after adjustment has been effected.

2. In bicycles, tricycles and the like, a one piece crank bearing bracket having a substantially vertical slot and at the sides of said slot a series of horizontally disposed slots, a bearing bush for the crank pin adjustably located within said substantially vertical slot, a flange at one end of said bush, projections carried by said flange and adapted to engage with any of the horizontally disposed slots at one side of the bush, a second flange screwed on the other end of the bush and projections carried by the second flange to engage with the corresponding horizontally disposed slot on the other side of the bracket, the bearing bush being supported directly by projections engaging any of the horizontally disposed slots.

WM. HUTTON.
EDWARD B. HAMMOND.